(12) United States Patent
Shiraishi

(10) Patent No.: US 9,259,871 B2
(45) Date of Patent: Feb. 16, 2016

(54) INJECTION MOLDING MACHINE

(71) Applicant: FANUC Corporation, Yamanashi (JP)

(72) Inventor: Wataru Shiraishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/525,328

(22) Filed: Oct. 28, 2014

(65) Prior Publication Data
US 2015/0125563 A1    May 7, 2015

(30) Foreign Application Priority Data

Nov. 1, 2013   (JP) ................................ 2013-228681

(51) Int. Cl.
| | | |
|---|---|---|
| *B29C 45/80* | (2006.01) | |
| *B29C 45/77* | (2006.01) | |
| *B29C 45/46* | (2006.01) | |
| *B29C 45/53* | (2006.01) | |
| B29C 45/17 | (2006.01) | |
| B29C 45/50 | (2006.01) | |

(52) U.S. Cl.
CPC ............... *B29C 45/77* (2013.01); *B29C 45/461* (2013.01); *B29C 45/53* (2013.01); *B29C 45/80* (2013.01); B29C 45/1761 (2013.01); B29C 45/5008 (2013.01); B29C 2945/762 (2013.01); B29C 2945/76006 (2013.01); B29C 2945/7618 (2013.01); B29C 2945/76498 (2013.01); B29C 2945/76595 (2013.01); B29C 2945/76678 (2013.01)

(58) Field of Classification Search
CPC ..................... B29C 45/5008; B29C 45/1761
USPC .......................................... 425/145, 574, 589
See application file for complete search history.

(56) References Cited

U.S. PATENT DOCUMENTS

| | | | |
|---|---|---|---|
| 6,365,075 B1 | 4/2002 | Kamiguchi et al. | |
| 2003/0111756 A1* | 6/2003 | Morita et al. ................ | 264/40.5 |
| 2004/0142056 A1* | 7/2004 | Watanabe et al. ............ | 425/145 |
| 2004/0265423 A1* | 12/2004 | Yoshioka et al. ............ | 425/574 |
| 2005/0208176 A1* | 9/2005 | Nishimura et al. .......... | 425/587 |

FOREIGN PATENT DOCUMENTS

| | | |
|---|---|---|
| JP | H08-80549 A | 3/1996 |
| JP | 10-6372 A | 1/1998 |
| JP | 2000-334791 A | 12/2000 |
| JP | 2006-334974 A | 12/2006 |

OTHER PUBLICATIONS

Office Action mailed Jan. 27, 2015, corresponding to Japanese patent application No. 2013-228681.

* cited by examiner

*Primary Examiner* — Tim Heitbrink
(74) *Attorney, Agent, or Firm* — Hauptman Ham, LLP

(57) ABSTRACT

An injection device includes a plunger that has a cylindrical portion formed in an outermost diameter. A nozzle adapter is provided with a molding material charge port. A pressure control device injects a molding material into a barrel through the molding material charge port and moves the plunger backward while applying a set back pressure thereto in a metering.

6 Claims, 3 Drawing Sheets

INJECTION MOLDING MACHINE

RELATED APPLICATIONS

The present application claims priority to Japanese Application Number 2013-228681, filed Nov. 1, 2013, the disclosure of which is hereby incorporated by reference herein in its entirety.

BACKGROUND OF THE INVENTION

1. Field of the Invention

The present invention relates to an injection molding machine, and particularly, to an inline type injection molding machine with a plunger.

2. Description of the Related Art

An inline type injection molding machine performs a molding cycle of plasticizing, measuring, and injecting a molding material by one screw. In the inline type injection molding machine, a molding material is supplied from a material input port formed in a base portion of a barrel to a base portion of a spiral groove formed in the screw, the molding material is plasticized and kneaded while the molding material is fed to the front side of the screw with the rotation of the screw, and the molding material is metered at the front side of the screw. Subsequently, a mold is closed, and the molding material is injected into the mold as the screw moves forward, thereby obtaining a molded product.

Hitherto, even in a case where the inline type injection molding machine molds a molding material such as liquid silicon having very low viscosity or does not need to perform a plasticizing or kneading operation, the molding material is injected from the material input port formed in the base portion of the barrel to an inner diameter portion of the barrel corresponding to the base portion of the screw, and the screw moves backward in a rotation state, so that the molding material is metered at the front side of the screw.

However, in the case of a molding material having very low viscosity which does not need the plasticizing and kneading operations or substantially does not need the plasticizing and kneading operations, a problem arises in that the material is degraded due to the shearing operation performed by the screw. Further, in the case of a molding material which needs slight shearing and kneading operations or the case of a screw with a flight, there is a case in which the molding material is sheared and kneaded too much.

Further, since a feeding force is needed due to the spiral structure of the flight for feeding the molding material to the front side of the screw regardless of the unnecessary kneading operation, an expensive screw with a spiral groove is needed.

Although a preplasticating type injection molding machine is also known, even this injection molding machine includes a device that plasticizes and kneads a molding material by a screw and feeds the molding material toward a nozzle as in the inline type injection molding machine. As a result, there are problems in that the molding material is sheared and degraded and the expensive plasticizing and kneading device is needed (JP-A 2006-334974 and JP-A 8-80549).

SUMMARY OF THE INVENTION

Therefore, the invention is made in view of the above-described problems of the related art, and an object of thereof is to provide an injection molding machine that and injects a liquid molding material by a plunger having an outermost diameter formed in a cylindrical surface.

For this reason, the liquid molding material is charged into a barrel from a nozzle or a nozzle adapter by a charge device. Further, the plunger having the outermost diameter formed in the cylindrical surface meters and injects the liquid molding material instead of the unnecessary screw with the spiral groove.

Further, when the metering operation is performed in a pressure control state by using the forward/backward movement and the rotation of the plunger as the feature of the inline type injection molding machine, the molding material may be metered in a kneaded state with the rotation of the plunger having a mixing unit provided at the front side thereof.

Then, according to the invention, there is provided an injection molding machine including an injection device and configured to perform a molding cycle of injecting a molding material supplied to an inner diameter portion provided in a barrel into a mold so as to mold the molding material, the injection molding machine including: a plunger disposed inside the barrel, having an outermost diameter formed in a cylindrical surface, and movable forward or backward and rotatable; a molding material charge portion configured to charge a liquid molding material to the front side of the plunger and provided in a nozzle when the nozzle is directly attached to the barrel or provided in the nozzle or a nozzle adapter when the nozzle is attached to the barrel through the nozzle adapter; and a control device configured to control the backward movement of the plunger based on the pressure of the liquid molding material charged from the molding material charge portion in a metering process of the molding cycle.

The molding material injection portion may be provided with a backflow prevention valve that prevents the backflow of the liquid molding material.

The injection molding machine may further include a pusher plate supported by a linear guide attached to an injection device base of the injection device and configured to transmit a forward/backward moving force to the plunger, and the control device is able to control a back pressure to a low pressure of 0 to 1 MPa by driving the pusher plate.

A base portion of the barrel may be provided with a second hole communicating with an inner diameter hole portion of the barrel.

The injection molding machine may further include a packing configured to prevent the backflow of the liquid molding material, provided in an inner diameter portion of the nozzle when the nozzle is directly attached to the barrel or provided in the inner diameter portion of the nozzle, an inner diameter portion of the nozzle adapter, or an inner diameter portion of a front end of the barrel when the nozzle is attached to the barrel through the nozzle adapter.

A mixing unit may be provided in a front end of the plunger, and the molding material may be metered while the plunger is rotated.

According to the invention, it is possible to provide the injection molding machine that meters and injects the liquid molding material by the plunger having an outermost diameter formed in the cylindrical surface to prevent the backflow of the molding material during the injection operation. That is, it is possible to provide the inexpensive injection molding machine capable of metering the molding material without unnecessarily shearing and kneading the molding material in the case of the molding material which does not need the plasticizing and kneading operations or slightly need the plasticizing and kneading operations.

BRIEF DESCRIPTION OF THE DRAWINGS

The above-described object, the other object, and the feature of the invention will be proved from the description of embodiments below with reference to the accompanying drawings. In these drawings.

DETAILED DESCRIPTION OF THE PREFERRED EMBODIMENTS

Figure 1:
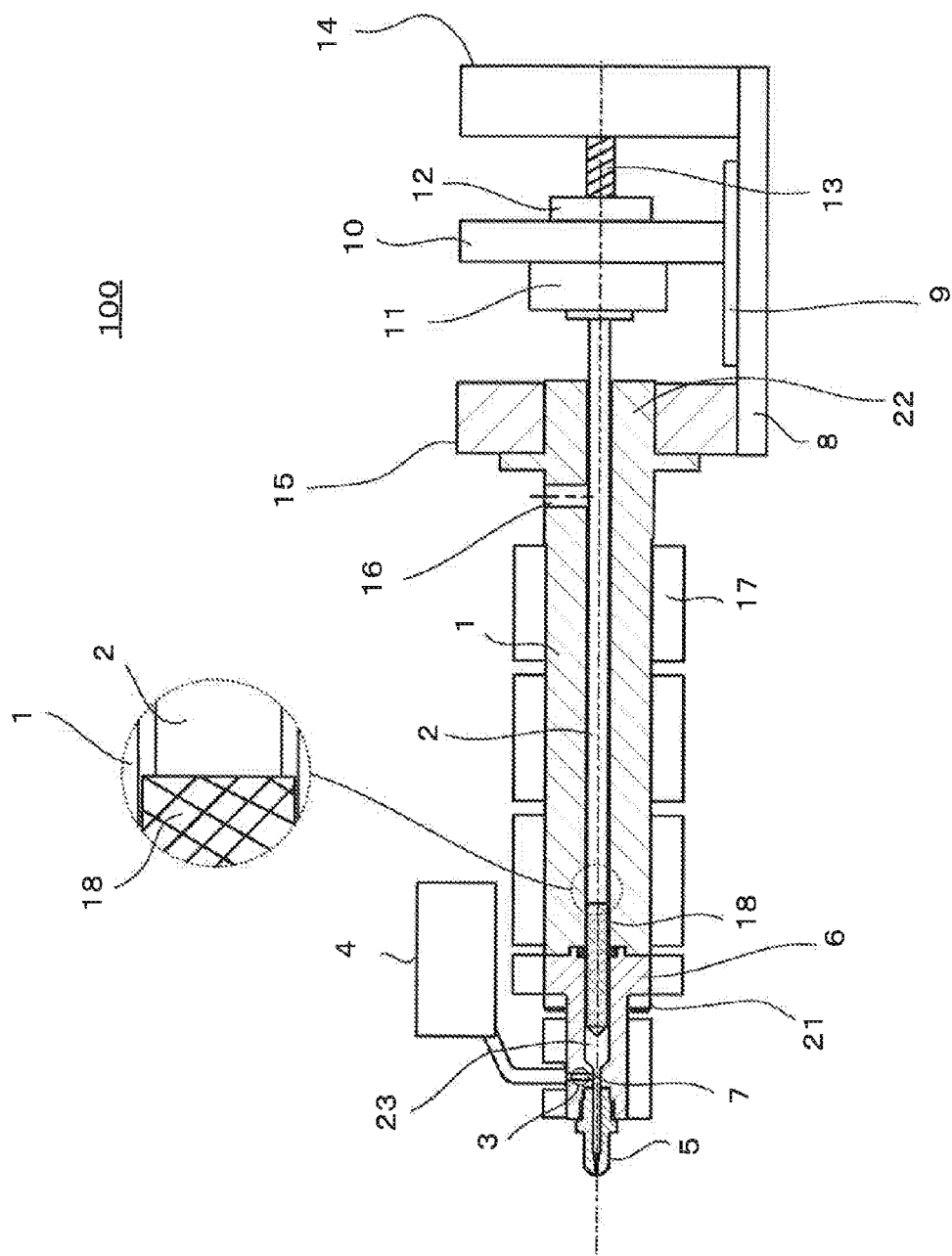
FIG. 1 is a diagram illustrating an embodiment of the invention.

FIG. 1 is a diagram illustrating an embodiment of the invention. An injection molding machine has a configuration in which an injection device and a mold clamping device are disposed on a machine stand so as to face each other. The inline type injection molding machine performs a molding cycle of injecting a molding material inside a barrel into a mold so as to mold the molding material inside the mold in accordance with a control of a control device. The control according to the embodiment of the invention may be also performed by the control device. The molding cycle includes an injection step, a holding pressure step, and a metering step. Since the embodiment of the invention has a feature in the injection device, the description for the other configurations will not be presented. The inline type injection molding machine is a machine that processes a liquid low-viscosity material as a molding material.

An injection device 100 includes a barrel 1 which has an inner portion extending in the longitudinal direction and is provided with a barrel inner diameter hole portion 23 as a through-hole having a cylindrical inner surface, and a plunger 2 which has an outermost diameter portion formed in a cylindrical surface (an outermost diameter cylindrical portion 18 of the plunger) and is movable forward or backward and rotatable inside the barrel inner diameter hole portion 23 of the barrel 1.

The outermost diameter cylindrical portion 18 of the plunger 2 is provided at the front end of the plunger 2 in order to prevent the backflow of the molding material toward the rear end of the plunger when the molding material is injected into a cavity of a mold. The diameter of the portion other than the outermost diameter cylindrical portion 18 in the plunger is smaller than that of the outermost diameter cylindrical portion 18. Accordingly, it is possible to prevent an increase in friction when the plunger 2 moves forward or backward.

A nozzle adapter 6 used to attach a nozzle 5 is fixed to the front end of the barrel 1 by a plurality of bolts 21. The nozzle adapter 6 is provided with, a molding material charge port 3 which is provided in the side portion thereof so as to charge a liquid low-viscosity molding material into the barrel inner diameter hole portion 23 of the barrel 1, and a backflow prevention valve 7 which prevents the molding material charged into the barrel inner diameter hole portion 23 of the barrel 1 from flowing backward from the molding material charge port 3. A temperature adjustment device 17 which adjusts the temperature inside the barrel 1 is attached to the outer peripheral surfaces of the barrel 1 and the nozzle adapter 6. A rear end 22 of the barrel 1 is fixed to a front plate 15.

A pressure control device (not illustrated), which may be configured as the control device controlling the injection molding machine, charges a molding material from a molding material charge device 4 into the barrel inner diameter hole portion 23 of the barrel 1 through the molding material charge port 3, and meters the amount of the molding material by moving the plunger 2 backward while applying a set back pressure in the metering step of the molding cycle (the metering step). After the mold closes, the pressure control device moves the plunger 2 forward so as to inject the molding material into the mold (the injection step).

The molding material charge device 4 is a device which generates a charging pressure by a driving force obtained from an air pressure, a hydraulic pressure, or an electric motor and injects the molding material from the molding material charge port 3 into the barrel inner diameter hole portion 23 of the barrel 1 at the front side of the plunger 2. The backflow prevention valve 7 may be provided in the molding material charge port 3 so that the molding material does not flow backward to the molding material charge device 4 through the molding material charge port 3 during the injection operation. The backflow prevention valve 7 may be configured as a valve which is used in a needle valve nozzle or the like or a highly durable valve which opens or closes a passageway by rotating a member provided with a passageway.

The injection device 100 further includes an injection device base 8 which is disposed on a machine stand (not illustrated). The injection device base 8 moves forward or backward by a driving unit such as a motor (not illustrated) provided in the injection device 100 so as to cause a touch or a release of the nozzle 5 with respect to a mold (not illustrated).

A linear guide 9 is fixed to the injection device base 8. A pusher plate 10 is guided by the linear guide 9 so as to move forward or backward with respect to the barrel 1, and transmits a forward/backward moving force to the plunger 2. The pusher plate 10 of the inline type injection molding machine includes a plunger rotation pulley 11 to which a rotational force is transmitted from a metering servo motor (not illustrated) and a pressure detector such as a load cell 12, and moves forward or backward by a thrust force applied from an injection ball screw 13 or the like. The pusher plate 10 is equipped with the metering servo motor (not illustrated), and the rotational driving force of the metering servo motor is transmitted to the plunger rotation pulley.

The injection ball screw 13 is rotatably supported by a rear plate 14. The rear plate 14 is equipped with an injection servomotor (not illustrated). When the pusher plate 10 driven by the injection servo motor is guided by the linear guide 9 in the front to back direction, the friction resistance during the movement of the pusher plate 10 is reduced, and hence the back pressure may be precisely controlled. Further, since the back pressure may be controlled at the low pressure of 0 to 1 MPa by the pressure control device, the back pressure may be controlled with high precision even in a low-pressure condition.

The base portion of the barrel inner diameter hole portion 23 is provided with a second hole 16 which communicates with the barrel inner diameter hole portion 23 in the barrel. In a case where gas is produced from the molding material or air is entrained, a molding failure caused by silver streaks or bubbles may be reduced by releasing the gas or the air from the second hole 16 in the barrel. Further, in a case where the molding material flows backward and leaks to the base portion of the plunger, the molding material may be simply removed from the second hole 16 in the barrel. Furthermore, the second hole 16 in the barrel may be also used as an input port through which a solid molding material is input when a molding operation is performed by using a solid resin material.

Figure 2:
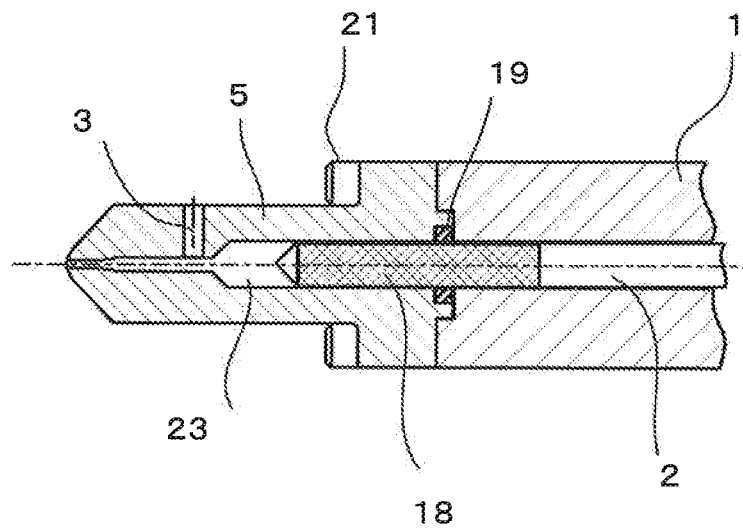
FIG. 2 is a diagram illustrating an embodiment in which a packing is provided in an inner diameter portion of a nozzle.
Figure 3:
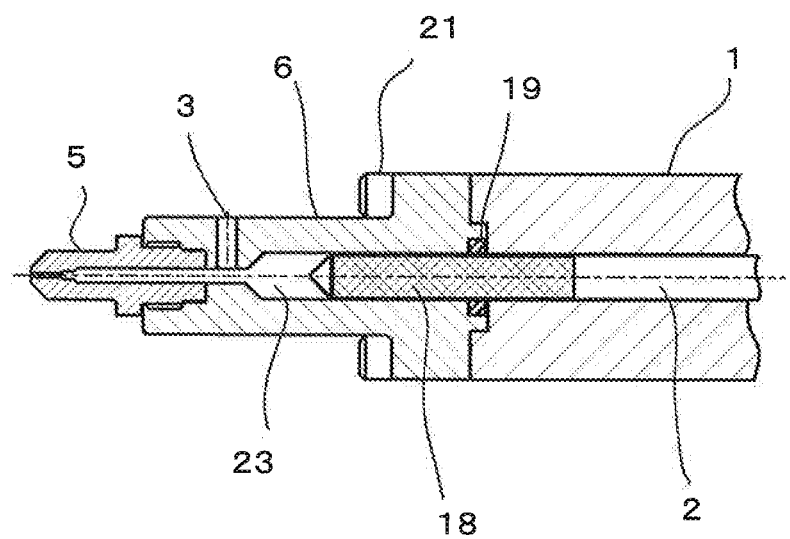
FIG. 3 is a diagram illustrating an embodiment in which a packing is provided in an inner diameter portion of a nozzle adapter.
Figure 4:
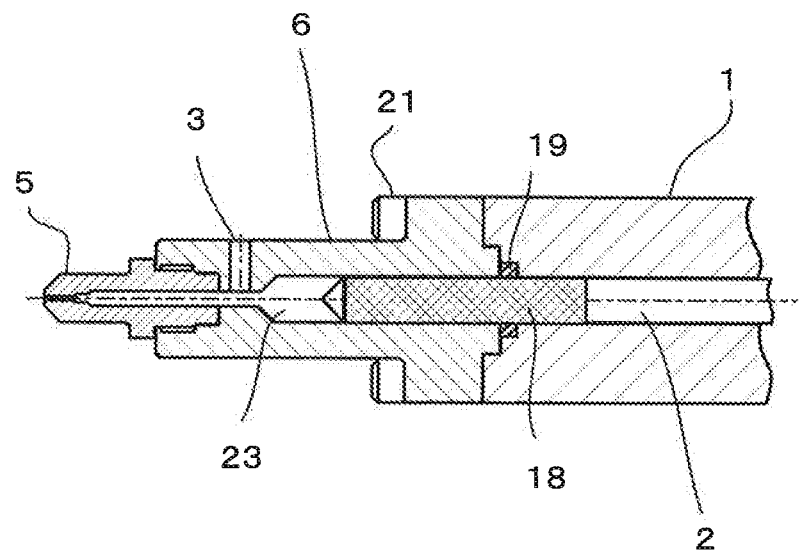
FIG. 4 is a diagram illustrating an embodiment in which a packing is provided in an inner diameter portion of a front end of a barrel.

Since the molding material used in the injection molding machine of the embodiment has high fluidity due to the low viscosity thereof, the molding material easily flows toward the base portion of the plunger 2 from a gap between the inner diameter of the barrel 1 and the outer diameter of the plunger 2. In order to prevent the flow, a packing is attached to a predetermined position. FIG. 2 is a diagram illustrating an embodiment in which a packing 19 is provided in the inner diameter portion of the nozzle, FIG. 3 is a diagram illustrating an embodiment in which the packing 19 is provided in the inner diameter portion of the nozzle adapter, and FIG. 4 is a diagram illustrating an embodiment in which the packing 19 is provided in the inner diameter portion of the front end of the barrel. Since the packing 19 is provided in the inner diameter portion of the nozzle, the inner diameter portion of the nozzle adapter, or the inner diameter portion of the front end of the barrel, the backflow of the molding material may be prevented. Furthermore, FIG. 2 is a diagram illustrating an embodiment in which the nozzle is directly attached to the barrel 1, and FIGS. 3 and 4 are diagrams illustrating an embodiment in which the nozzle is attached to the barrel 1 through the nozzle adapter 6.

Figure 5:
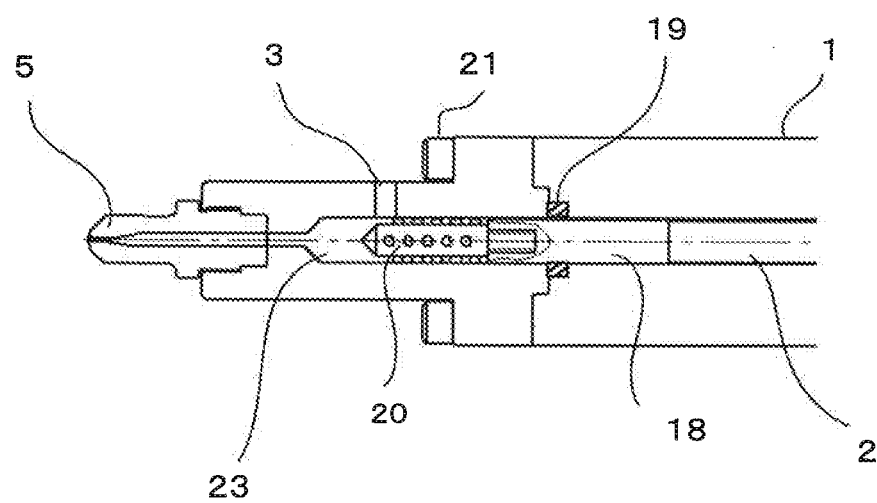
FIG. 5 is a diagram illustrating a plunger having a short mixing unit at the front side thereof.

FIG. 5 is a diagram illustrating the plunger 2 having a short mixing unit 20 provided at the front side thereof. When the metering is performed while the plunger 2 having the short mixing unit 20 provided at the front side thereof is rotated, the optimum shearing or kneading operation may be performed for the molding material. Further, since the length of the mixing unit processed at high cost is set as short as possible, a useless increase in cost may be suppressed.

Due to the above-described embodiment, a molding operation may be performed without shearing or kneading the molding material or a molding operation may be performed while intentionally shearing or kneading the molding material by a necessary amount.

Furthermore, since an injection molding operation of plasticizing and kneading the molding material by a general flight attachment screw may be also performed just by exchanging a nozzle, a screw, a barrel, and the like of a general inline type injection molding machine with the nozzle, the plunger, the barrel, and the like used in the injection molding machine of the embodiment, it is possible to simply and inexpensively treat more various molding materials by one inline type injection molding machine.

The invention claimed is:

1. An injection molding machine including an injection device and configured to perform a molding cycle of injecting a molding material supplied to an inner diameter portion provided in a barrel into a mold, so as to mold the molding material, the injection molding machine comprising:

a plunger disposed inside the barrel, having an outermost diameter formed in a cylindrical surface, and movable forward or backward and rotatable;

a molding material charge portion configured to charge a liquid molding material to the front side of the plunger, and provided in a nozzle when the nozzle is directly attached to the barrel or provided in the nozzle or a nozzle adapter when the nozzle is attached to the barrel through the nozzle adapter; and a control device configured to control the backward movement of the plunger based on the pressure of the liquid molding material charged from the molding material charge portion in a metering of the molding cycle.

2. The injection molding machine according to claim 1, further comprising:

a backflow prevention valve configured to prevent the backflow of the liquid molding material, and provided in the molding material charge portion.

3. The injection molding machine according to claim 1, further comprising:

a pusher plate supported by a linear guide attached to an injection device base of the injection device and configured to transmit a forward or backward moving force to the plunger, wherein the control device is configured to control a back pressure to a low pressure of 0 to 1 MPa by driving the pusher plate.

4. The injection molding machine according to claim 1, further comprising:

a first hole communicating with an inner diameter hole portion of the barrel, and provided in a base portion of the barrel.

5. The injection molding machine according to claim 1, further comprising:

a packing configured to prevent the backflow of the liquid molding material, provided in an inner diameter portion of the nozzle when the nozzle is directly attached to the barrel, or provided in the inner diameter portion of the nozzle, an inner diameter portion of the nozzle adapter, or an inner diameter portion of a front end of the barrel when the nozzle is attached to the barrel through the nozzle adapter.

6. The injection molding machine according to claim 1, further comprising:

a mixing unit provided in a front end of the plunger, wherein the plunger is configured to meter the molding material while the plunger is rotated.

\* \* \* \* \*